US009195776B2

(12) United States Patent
Chandak et al.

(10) Patent No.: US 9,195,776 B2
(45) Date of Patent: Nov. 24, 2015

(54) SYSTEMS AND METHODS OF MULTISITE ADMINISTRATOR LOGGING

(71) Applicant: Internet Brands, Inc., El Segundo, CA (US)

(72) Inventors: Virendra Chandak, Los Angeles, CA (US); Noam Katz, Simi Valley, CA (US)

(73) Assignee: Internet Brands, Inc., El Segundo, CA (US)

( * ) Notice: Subject to any disclaimer, the term of this patent is extended or adjusted under 35 U.S.C. 154(b) by 0 days.

(21) Appl. No.: 14/514,340

(22) Filed: Oct. 14, 2014

(65) Prior Publication Data

US 2015/0106693 A1    Apr. 16, 2015

Related U.S. Application Data

(60) Provisional application No. 61/889,936, filed on Oct. 11, 2013.

(51) Int. Cl.
*G06F 17/22* (2006.01)
*G06F 17/30* (2006.01)

(52) U.S. Cl.
CPC ...... *G06F 17/30905* (2013.01); *G06F 17/2288* (2013.01); *G06F 17/30162* (2013.01)

(58) Field of Classification Search
CPC .......... G06F 17/30162; G06F 17/2288; G06F 17/30905
USPC .......................................................... 707/684
See application file for complete search history.

(56) References Cited

U.S. PATENT DOCUMENTS

| | | | | |
|---|---|---|---|---|
| 5,864,849 A * | 1/1999 | Bohannon et al. | ............ | 707/648 |
| 7,636,174 B2 * | 12/2009 | Fukuda | ........................ | 358/1.15 |
| 7,660,836 B2 * | 2/2010 | Bolik et al. | .................... | 707/640 |
| 7,801,846 B2 * | 9/2010 | Devine et al. | ................. | 707/609 |
| 8,296,271 B1 * | 10/2012 | Richardson et al. | .......... | 707/674 |
| 8,301,600 B1 * | 10/2012 | Helmick et al. | .............. | 707/648 |
| 8,307,001 B2 * | 11/2012 | Ager et al. | ..................... | 707/783 |
| 8,762,332 B2 * | 6/2014 | Keebler et al. | ................ | 707/622 |
| 2011/0246428 A1 * | 10/2011 | Alfano et al. | ................. | 707/661 |
| 2011/0258164 A1 * | 10/2011 | Mandagere et al. | .......... | 707/685 |
| 2012/0179648 A1 * | 7/2012 | Loo | ................................ | 707/609 |
| 2014/0344224 A1 * | 11/2014 | LeBert et al. | ................. | 707/684 |

OTHER PUBLICATIONS

Unpublished documentation for CPHub, complied by employees of Internet Brands, Inc., Dec. 2011 (see attached Explanation of Relevance).

* cited by examiner

*Primary Examiner* — Jorge A Casanova
(74) *Attorney, Agent, or Firm* — Rosenberg, Klein & Lee (57) ABSTRACT

A change manager module in communication with a website receives copies of instructions to change the content or configuration of the website. These instructions are formatted into an entry for a log and stored in a log associated with the website. The entry may contain identifiers for the entry, the party that requested the change, and the website, as well as a timestamp of the time of the change, and information identifying a changed feature of the website and a changed state of the changed feature. A copy of the log entry is also transmitted to a central database in a separate memory from the memory containing the website, which stores entries from multiple websites for viewing and organizing. Entries reflecting undesired changes may then be reverted based on the data in the log entries.

15 Claims, 6 Drawing Sheets

SYSTEMS AND METHODS OF MULTISITE ADMINISTRATOR LOGGING

CROSS-REFERENCE TO RELATED APPLICATIONS

This application claims the benefit of U.S. Provisional Application No. 61/889,936, filed on Oct. 11, 2013 in the US Patent and Trademark Office. All disclosures of said provisional application are incorporated herein by reference.

BACKGROUND OF THE INVENTION

1. Field of the Invention

The present invention relates to the logging, in a centralized database, of changes made to websites. In particular, although not exclusively, a change manager module is associated with each of a plurality of websites, storing a log of changes made through an administrator interface, and the entries in this log are transmitted to a central database with or without filtering.

2. Description of the Related Art

A major advantage of the Internet over "hard copy" in the presentation of data is that data on the Internet is not static, but may be altered to reflect new information and new presentation needs. A website will have a designated administrator or administrators who have the ability to add to or amend the information on the website, and even the design elements or layout, as the situation demands. Other configuration details of the website may also be amended, such as security features and associated email addresses. Additionally, some websites are designed to receive information or content from other participants or "users": for instance, online forums and communities may allow any user to create and reply to "posts," while content repositories such as YouTube or DeviantArt may allow a registered user to upload images, text, video, or other materials for presentation.

A change to a website may be inadvertently or deliberately undesirable because, for instance, newly supplied content is inaccurate, contains harmful code, or is not in keeping with the themes or goals of the website; the change removes or changes content that should have remained as it was; or the change alters security on the website to allow other undesired activity. It is therefore desirable to have a system implemented which can detect and reverse undesired changes.

SUMMARY OF THE INVENTION

While not limited thereto, an embodiment of the present invention is directed to a method of processing changes to websites, the method including receiving a first instruction to change a first website; creating a first log entry reflecting the first instruction; and transmitting a copy of the first log entry to a memory containing a central database for storage in the central database, wherein the memory containing the first website does not contain the central database.

According to an aspect of the invention, the method may further include receiving a second instruction to change a second website separate from the first website; creating a second log entry reflecting the second instruction; and transmitting a copy of the second log entry to the memory containing the central database for storage in the central database, wherein the memory containing the second website does not contain the central database.

According to an aspect of the invention, a memory containing the first website might not contain any portion of the second website, and a memory containing the second website might not contain any portion of the first website.

According to an aspect of the invention, one or both log entries may include an entry identifier unique to the log entry, an administrator identifier identifying the party that provided the instruction, a website identifier identifying the website, a timestamp reflecting a time of the receipt of the instruction or the changing of the website, information identifying a changed feature of the website changed in accordance with the instruction, and changed state data reflecting a state of the changed feature following the change.

According to an aspect of the invention, the method may further include, before transmitting a copy of the first log entry, receiving a request for the log entry from a central processor associated with the memory containing the central database, wherein the log entry request is sent from the central processor each time a regular time period T elapses.

According to an aspect of the invention, the creation of the first log entry may include locating, in a type mapping table, a table entry listing a feature matching the changed feature of the website, and further listing change details matching elements of the changed state data; reading from the table entry a change type identifier specifying a type of the first instruction; and storing the change type identifier to the first log entry.

According to aspects of the invention, the change type identifier of the first log entry may determine whether the first log entry will be transmitted or stored in the central database.

According to an aspect of the invention, the first log entry may further include prior state data reflecting a state of the changed feature prior to the change.

According to an aspect of the invention, the method may further include, after transmitting the copy of the first log entry, receiving an reversion instruction to revert the first instruction; reading, from the reversion instruction, information identifying a changed feature and prior state data; and changing, in the first website, the identified changed feature to reflect the prior state data of the reversion instruction.

According to an aspect of the invention, the method may further include storing the first log entry to a first change log associated with the first website.

According to an aspect of the invention, the method may further include, after transmitting the copy of the first log entry, receiving an reversion instruction to revert the first instruction; extracting an information identifying a changed feature and a timestamp from the reversion instruction; searching the first change log for a prior log entry containing a timestamp prior to the timestamp of the reversion instruction and further containing an information identifying a changed feature which matches that of the reversion instruction; and changing, in the first website, the identified changed feature to reflect changed state data in the prior log entry.

According to an aspect of the invention, any of the above methods may be encoded, on a non-transitory computer readable medium, as processing instructions to be implemented by one or more processors.

While not limited thereto, an embodiment of the present invention is directed to a system of processing changes to websites, the system including: a first non-transitory computer readable memory; a first processor in communication with the first memory; a first transceiver in communication with the first processor and further in communication with a network; a second non-transitory computer readable memory; a second processor in communication with the second memory; and a second transceiver in communication with the first processor and further in communication with the network.

According to an aspect of the invention, the first processor may be configured to: receive a change instruction to change a website contained on the first memory; create a log entry reflecting the change instruction; change the website in accordance with the change instruction, and transmit a copy of the log entry through the first transceiver over the network to the second transceiver, and the second processor may be configured to: receive the copy of the log entry through the second transceiver, and store the copy of the log entry to a database contained on the second memory.

According to an aspect of the invention, the log entry may include an entry identifier unique to the log entry, an administrator identifier identifying the party that provided the instruction, a website identifier identifying the website, a timestamp reflecting a time of the receipt of the instruction or the changing of the website, information identifying a changed feature of the website changed in accordance with the instruction, and changed state data reflecting a state of the changed feature following the change.

According to an aspect of the invention, the first processor may be further configured to: locate, in a type mapping table, a table entry listing a feature matching the changed feature of the website, and further listing change details matching elements of the changed state data; read from the table entry a change type identifier specifying a type of the change instruction; and store the change type identifier to the log entry.

According to an aspect of the invention, the first processor may be further configured not to store the change type identifier to the log entry or to transmit a copy of the log entry unless the received change type identifier is designated as a red flag change type identifier.

According to an aspect of the invention, the second processor may be further configured to: locate, in a type mapping table, a table entry listing a feature matching the changed feature of the website, and further listing change details matching elements of the changed state data; read from the table entry a change type identifier specifying a type of the change instruction; and store the change type identifier to the log entry.

According to an aspect of the invention, the second processor may be further configured not to store the change type identifier to the copy of the log entry or to store the copy of the log entry to the database unless the received change type identifier is designated as a red flag change type identifier.

According to an aspect of the invention, the log entry may further include prior state data reflecting a state of the changed feature prior to the change.

According to an aspect of the invention, the second processor may be further configured to: receive a reversion request for the change instruction, and transmit, through the second transceiver, a reversion instruction comprising the information identifying a changed feature of the change instruction and the prior state data of the change instruction; and the first processor may be further configured to: receive, through the first transceiver, the reversion instruction, read, from the reversion instruction, the information identifying a changed feature and the prior state data, and change, in the website, the identified changed feature to reflect the prior state data of the reversion instruction.

According to an aspect of the invention, the second processor may be further configured to: receive a reversion request for the change instruction, and transmit, through the second transceiver, a reversion instruction comprising the information identifying a changed feature of the change instruction and the timestamp of the change instruction; and the first processor may be further configured to: store the log entry reflecting the change instruction to a change log contained on the first memory, receive, through the first transceiver, the reversion instruction, search the change log for a prior log entry containing a timestamp prior to the timestamp of the reversion instruction and further containing an information identifying a changed feature which matches that of the reversion instruction, and change, in the website, the identified changed feature to reflect the changed state data of the prior log entry.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

The titles of each section of this application are for convenience only, and should not be interpreted as limiting the scope of the invention.

Use of the singular or plural in this description should not be interpreted to limit the scope of the invention to the singular or plural, except where the number or range is made explicit (e.g., "one element" or "a plurality of elements" would be explicit, whereas "an element" or "elements" would not be). Also, male and/or female pronouns may be used throughout this description for convenience, and should not be interpreted as limiting.

1. Glossary

User: As in, "a user of a website." An individual capable of making changes to the website. An administrator is a type of user.

To contain a website (in a memory): To store data that can be used by a web browser to render the website as one or more web pages. To contain only a "portion" of a website is to store data that can be used by a web browser to render some of the website (namely, the contained "portion"), but not all of the website, as one or more web pages. To not contain any portion of a website is to store insufficient data to render any part of the website as a web page.

To contain a database (in a memory): To store all data stored within the database.

Content: Any data that is part of any file capable of being rendered by a web browser to be viewed as a web page or part of one.

2. System and Data Structure Embodiments

A series of semi-related or unrelated websites may be under the control of a single entity. The entity may be a website provider for numerous companies, or a business conglomerate. In such circumstances, it may be convenient to monitor all websites through a single interface, regardless of whether they share a host.

Figure 1A:
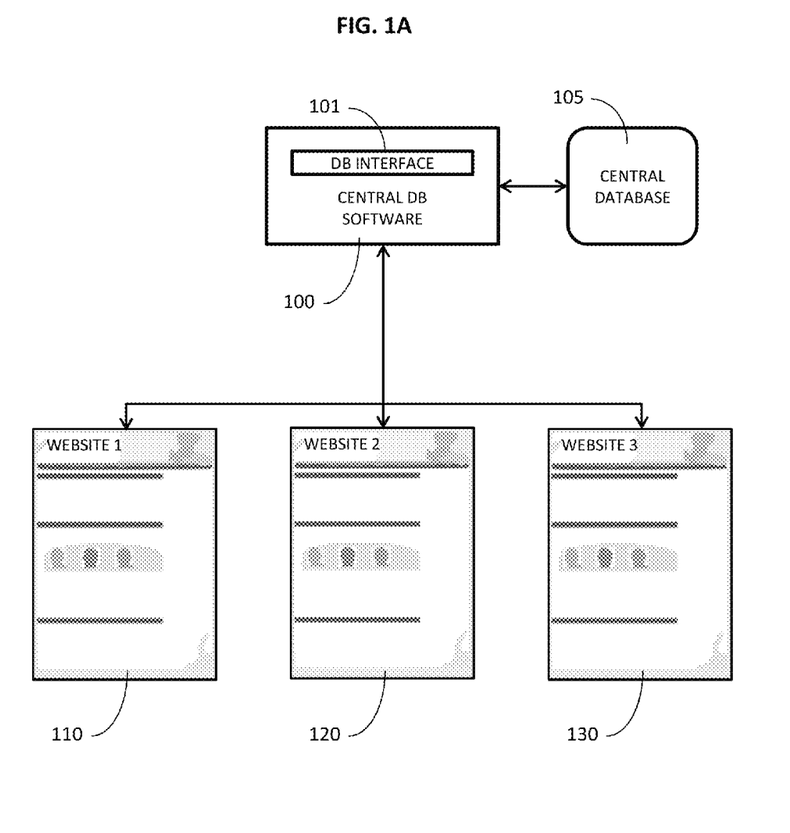
FIG. 1A is an abstract depiction of an interaction of various programs, according to an embodiment of the invention.

FIG. 1A is an abstract depiction of an interaction of various programs, according to an embodiment of the invention. As seen in the embodiment of FIG. 1A, software 100 associated with a central database 105 is in communication with websites 110, 120, 130 which are being monitored. The central database software 100 includes a database interface 101 for an organized viewing of the data within.

Although these websites 110, 120, 130 may be hosted on the same server as each other and the central database software 100, in many embodiments or implementations they will be hosted on separate servers or contained, at least partially, on separate memories from the central database software 100, and may also be separated from each other in the same manner. When the websites 110, 120, 130 are contained in separate memories from the memory containing the central database software 100, communication between the software 100 and the websites 110, 120, 130 may be through a network such as the Internet or a local network.

Three websites 110, 120, 130 are depicted in FIG. 1A, and the remainder of the description will also assume three websites for convenience. However, it is understood that the scope of the invention may allow for any number of monitored websites, including one, and furthermore that monitored websites may be added to or removed from a single implementation of the invention over time, as needed.

For convenience, only website 110 will be described in detail hereinafter. It is understood that the same or a comparable description will apply to all websites.

Figure 1B:
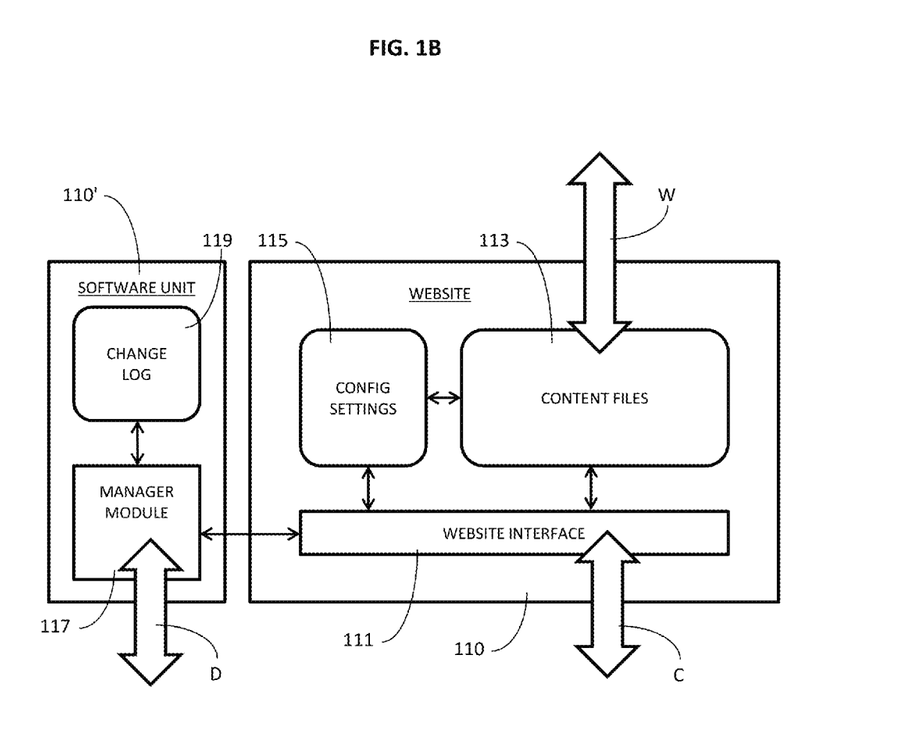
FIG. 1B is a block diagram depicting interactions of modules and data within a website, according to an embodiment of the invention.

FIG. 1B is a block diagram depicting interactions of modules and data within the website 110, according to an embodiment of the invention. As seen in the embodiment of FIG. 1B, an administrator is able to make changes to the website 110. Specifically, an interface 111 supplied by the website host, such as a control panel module, may be in communication through a control communication point C with the administrator to receive change input. The website includes one or more content files 113 which may be communicated for viewing through the Internet at a web communication point W. The interface 111 may allow direct edits to the content files 113 through numerous editors and script or database setup software, and may also allow an administrator to upload new files such as individual web pages, images, and scripts.

Changes may also include alterations of the configuration settings 115 of the website, which may influence the output at web communication point W of the content files 113, or generate additional output of its own also through W. For instance, an admin may be able to set up email accounts in association with the website, each account having numerous features. An admin may also be able to arrange portions of the website into subdomains or folders. An admin may also be able to set and change security protections and privileges on portions of the website, limiting access or possible interactions, such as Internet viewing of specific content or use of secure forms. An admin may also be able to set up quality control features such as a system backup or a security certificate. An admin may also be able to create other administrator accounts, or other user accounts. Still other changes to the configuration settings 115 are possible and will vary depending on the available features provided by the web host.

When a change is made to the website 110 through the interface 111, a change manager module 117 saves data regarding that change as an entry in a change log 119 for that website. In some embodiments, each changed feature of the website will receive its own entry, while in others, multiple features changed at the same time or in a related manner may be combined into a single entry. The change manager module 117 is also in communication with the central database software 100 through a database communication point D.

In the embodiment depicted in FIG. 1B, the change manager module 117 and change log 119 form a distinct software unit 110' which is separate from the website 110 software and data. However, in some embodiments the module 117 and log 119 are fully integrated with the software and data of website 110.

In some embodiments, two or more of communication points C, D, and W may share the same hardware, such as a transceiver, for communication. In other embodiments, each communication point will have its own dedicated hardware.

The data structure of a log entry in the change log 119 will now be detailed. Namely, in some embodiments, each log entry will contain the following data elements:

The log entry may contain an entry identifier, which may take a numeric, alphabetic, or alphanumeric form, and may also contain symbols. The entry identifier should be unique among all entries originating from the source website of the entry; in some embodiments, it may be unique among all entries in the entire system.

The log entry may contain an administrator identifier, which may take a numeric, alphabetic, or alphanumeric form, and may also contain symbols. The administrator identifier should be unique among all administrators originating from the source website of the entry; in some embodiments, it may be unique among all administrators in the entire system. The administrator identifier will identify the administrator who requested the change reflected in the log entry. The administrator identifier may be, or may be derived from, an administrator username.

The log entry may contain a source website identifier, which may take a numeric, alphabetic, or alphanumeric form, and may also contain symbols. The source website identifier should be unique among all websites in the entire system. The source website identifier will identify the website which was affected by the change reflected in the log entry. The source website identifier may be, or may be derived from, a title, owner, or address (such as a URL) of the website. In some embodiments, the source website identifier may be present in the copy of the log entry transmitted to the central database (this process described further hereinafter), without being included in the log entry that is saved to the change log for the website; in such embodiments, the source website identifier may be added to the log entry copy at the time of transmission.

The log entry may contain a time stamp. Depending on the embodiment, this may reflect the time when the change was initiated or completed, or when the entry was saved to the database. In some embodiments, the log entry may contain two or more time stamps reflecting two or more of the above times.

The log entry may contain a set of change data. The change data may include a statement reflecting a feature of the website that has been changed, which will be referred to as the "changed feature" hereinafter. The statement may also include a changed state of the feature—that is, its state after the change is completed—which will be referred to as the "change state data" hereinafter. Formatting for these statements may vary as is convenient for the specific implementation, but a simple example of one of many possible formats may take the following form: "PAGE->Add, ADDRESS->newpage.html;". In this example, this statement within the change data indicates that a webpage was added to the website and given the address "newpage.html" within the website. In this particular format, the changed state data includes subfeatures for which their own changed state is described; in this example, an address has been changed and its changed state is described as newpage.html. A more extensive statement might also include other details or changed subfeatures of the page such as meta data or even the complete content of the page. In at least some of the embodiments where multiple changed features are referenced in a single log entry, the set of change data may contain more than one statement, each statement referencing a changed feature.

Additionally, in some embodiments, each log entry will contain one or more of the following pieces of data:

The log entry may contain an administrator username. Where the identifier for an administrator is not necessarily the same as the username for the same administrator, the administrator's username may also be included. This may be the case where, for instance, it is desired that the administrator identifier be unique among all administrators in the entire system, but where administrator usernames are not necessarily unique among all administrators in the entire system. The administrator username will be the username of the administrator who requested the change reflected in the log entry.

The log entry may contain a change type identifier, which may take a numeric, alphabetic, or alphanumeric form, and may also contain symbols. In embodiments where log entries contain a change type identifier, a plurality of available change types will be named with identifiers in a type mapping table. This type mapping table may be contained in the central database 105, or in a different database, possibly in direct communication with the change manager module 117. In some embodiments, the change type for a given change is determined by searching for a changed feature, and perhaps other relevant details in the change data, within the type mapping table, and returning the associated change type identifier. For example, a sample section of a mapping table from an example embodiment and mapping table configuration is shown below in Table 1, with numerical labels added for convenience. In a sample search, the change data may include the statement "USERLIST->Add, USERNAME->johnsmith, EMAIL->johnsmith@website.com, SECLEVEL->Admin;". The changed feature is the "USERLIST", so a search of the mapping table would therefore first check for all change types with that changed feature. This check eliminates the types labeled 1022 and 1023. However, because more than one change type has "USERLIST" as the changed feature—namely, the types labeled 1024 to 1027—the search process will then look further based on other information, such as the changed state data, in the change statement. In this embodiment, relevant details in the changed state data for a USERLIST change may include whether the affected user is newly created or previously existed, and whether their security level has been altered. Because a detail of the changed feature is "Add," the search process will therefore first check whether, among the "USERLIST" change types, "Add" is among the relevant details of at least one change type. It is, but for both types 1024 and 1025, so the search process must continue. The search process therefore searches for changed subfeatures listed in the changed state data, checking for each one at a time. In this case, the first changed subfeature is "USERNAME" but this is not listed in either 1024 or 1025 and is therefore ignored; the same is true of "EMAIL:" which is also ignored. However, the third changed subfeature, "SECLEVEL", is listed in both 1024 and 1025. The details of the change to the "SECLEVEL" subfeature are then checked against both 1024 and 1025, and only type 1024 contains the "Admin" detail. Therefore, type 1024's change type identifier, ADD_NEW_ADMIN, is the result of the search process, and is included in the log entry. In at least some of the embodiments where the change data can contain more than one statement, each such statement results in a type mapping table search, and the resulting log entry stores the change type identifier resulting from each search.

TABLE 1

| | Change Type Identifier | Changed Feature | Relevant Details |
|---|---|---|---|
| . | . | . | . |
| . | . | . | . |
| . | . | . | . |
| 1022 | PAGE_SECURITY_ON | PAGESECURITY | On |
| 1023 | PAGE_SECURITY_OFF | PAGESECURITY | Off |
| 1024 | ADD_NEW_ADMIN | USERLIST | Add, SECLEVEL -> Admin |
| 1025 | ADD_NEW_NONADMIN | USERLIST | Add, SECLEVEL -> Basic |
| 1026 | CHANGE_ADMIN_TO_USER | USERLIST | Change, SECLEVEL -> Admin |
| 1027 | CHANGE_USER_TO_ADMIN | USERLIST | Change, SECLEVEL -> Basic |
| . | . | . | . |
| . | . | . | . |
| . | . | . | . |

The log entry may contain a set of pre-change data, which will take the same format as the set of change data. In particular, the change state data for the pre-change data will be referred to as "prior state data" hereinafter. Statements in the pre-change data note the state of each feature to be changed before it is changed. For example, if the security level for an existing user has been changed from Admin to Basic, a statement in the change data will list the user's "SECLEVEL" as Basic, while a corresponding statement in the pre-change data will list the user's "SECLEVEL" as Admin. In some embodiments, the change data and the pre-change data will be combined as a single unit of data.

Additional data may also be included in the log entry without departing from the scope of the invention.

3. Method Embodiments

Figure 2:
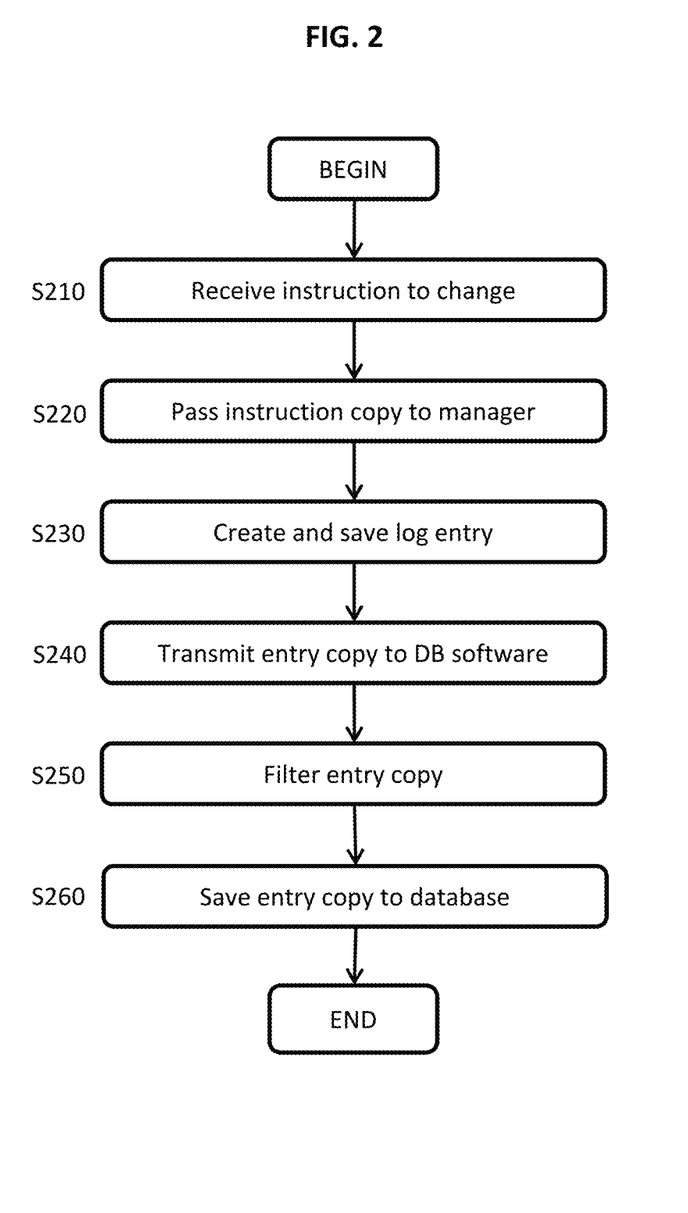
FIG. 2 is a flowchart depicting a method of storing website changes to a central database, according to an embodiment of the invention.

FIG. 2 is a flowchart depicting a method of storing website changes to a central database, according to an embodiment of the invention. As seen in the embodiment of FIG. 2, the website 110 receives an instruction to change the website through the interface 111, at S210, and a copy of the instruction is passed to the change manager module 117 by the interface, at S220. The change manager module 117 then creates and saves a log entry reflecting the instruction to the change log 119, at S230. The change manager module 117 also transmits a copy of the log entry to the central database software 100, at S240, which the database software 100 stores to the database 105 at S260.

In some embodiments, the interface 111 will confirm that the change has been completed in the content files 113 or configuration settings 115 before it sends the instruction copy at S220. In particular, this will be necessary where at least one time stamp in the log entry reflects the time when the change was completed.

Figure 3:
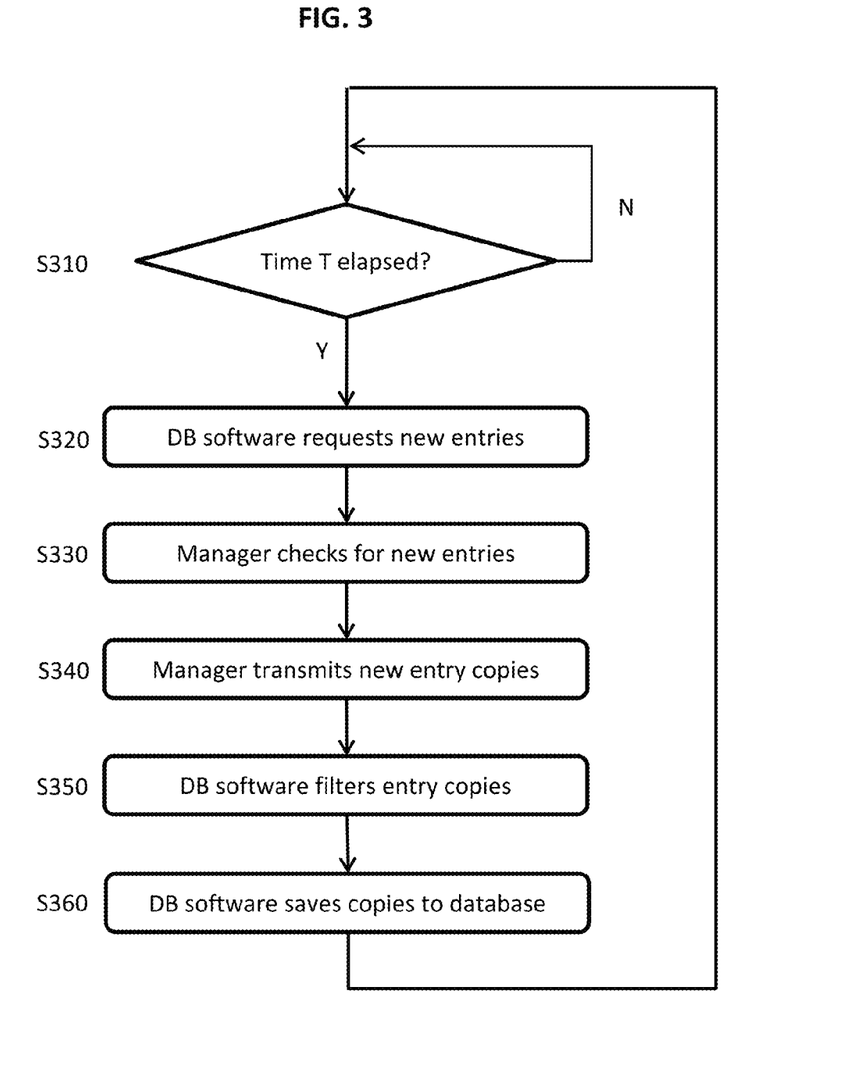
FIG. 3 is a flowchart depicting an alternative method of storing website changes to a central database, according to an embodiment of the invention.

FIG. 3 is a flowchart depicting an alternative method of storing website changes to a central database, according to an embodiment of the invention. The embodiment of FIG. 3 assumes that S210, S220, and S230 occur as in FIG. 2 each time a change is made to the website 110, and a description of these operations will not be repeated. S240 and onward, however, do not occur in conjunction with the method of FIG. 3.

Instead, as seen in the embodiment of FIG. 3, the database software 100 checks whether a defined time period T has elapsed since it last sent a request to the website 110, at S310. If so, the database software 100 sends a request to the website 110 at S320, requesting all log entries since the last such request for the same website. In some embodiments, the time of the last request is stored with the website and accessed when a request is received, while in other embodiments the time of the last request is stored with the central database and included in the current request.

In response to the request S320, the change manager module 117 checks the change log 119 for all log entries stored since the last such request, at S330, and transmits copies of these new entries to the database software 100 at S340. The log entries in the transmission are then stored in the database 105 at S360.

Referring to both FIGS. 2 and 3, the database software 100 may, in some embodiments, filter the received log entries according to a configuration of the software before adding them to the database 105, at S250/S350. That is, the software 100 may store to the database 105 only log entries that meet certain requirements. In particular, it may be desirable to store only log entries that show "red flags"; e.g. undesired changes or changes to particular sensitive sections of the website. Which changes are undesired or sensitive will vary from website to website and web host to web host. However, a common red flag could be designated key words (such as scripting language or profanity) added to pages or portions of pages that should not contain such content. Another common red flag might be deletion of data or files, especially without a corresponding replacement. Yet another common red flag may be any change to a security configuration, especially the deactivation of a security feature. Still another common red flag may be a rapid series of changes (determined by a comparison of timestamps between received entries), which might indicate a lack of caution, a malicious "hacker" attack, or an unintended overlap of changes between two administrators. It may also be possible in some embodiments to designate certain pages or other data, especially database contents or sensitive scripts, as "valued," in which case all changes to those pages or other data will be red flags.

In at least some embodiments where change type identifiers are included in log entries, these identifiers may be used to assist in the identification of red flags, and the plurality of available change types may include change types that are always red flags. In embodiments where the type mapping table is in the central database, this identifier may be determined by the database software 100 at the beginning of S250/S350, and thus will be present in the entries in the central database 105 but not those in the change log 119. In embodiments where the type mapping table is accessed directly by the change manager module 117, this identifier may be determined by the change manager module 117 at S230, and in at least some of these embodiments may allow the change manager module 117 to conduct the filtering S250/S350, in such embodiments S250/S350 will occur prior to the transmission S240/S340, and only entries that pass the filter will be transmitted at S240/S340.

Once stored to the central database 105, change log entries in the central database 105 may be viewed through the database software interface 101, either in individual or list views. The software interface 101 may have the option to present a list of all change entries for a specific time period, such as a day, week, month, etc. The software interface 101 may also have the option to present a list of all change entries associated with a specific website, or a specific administrator. Other search parameters may also be available and will be easily conceived of by those of skill in the art.

In some embodiments, either in place of the filtering S250/S350 or as a complement to it, the software interface 101 may provide a search for certain "red flag" changes; e.g. undesired changes or changes to particular sensitive sections of the website. The software 100 itself may also conduct regular automated analysis of the database 105 for patterns that indicate red flag activity. When a red flag change is detected, either when added to the database 105 or later through analysis, the software 100 may generate an alert which may be viewed through the software interface, or even communicated directly to designated parties through methods such as email or text messages.

Figure 4A:
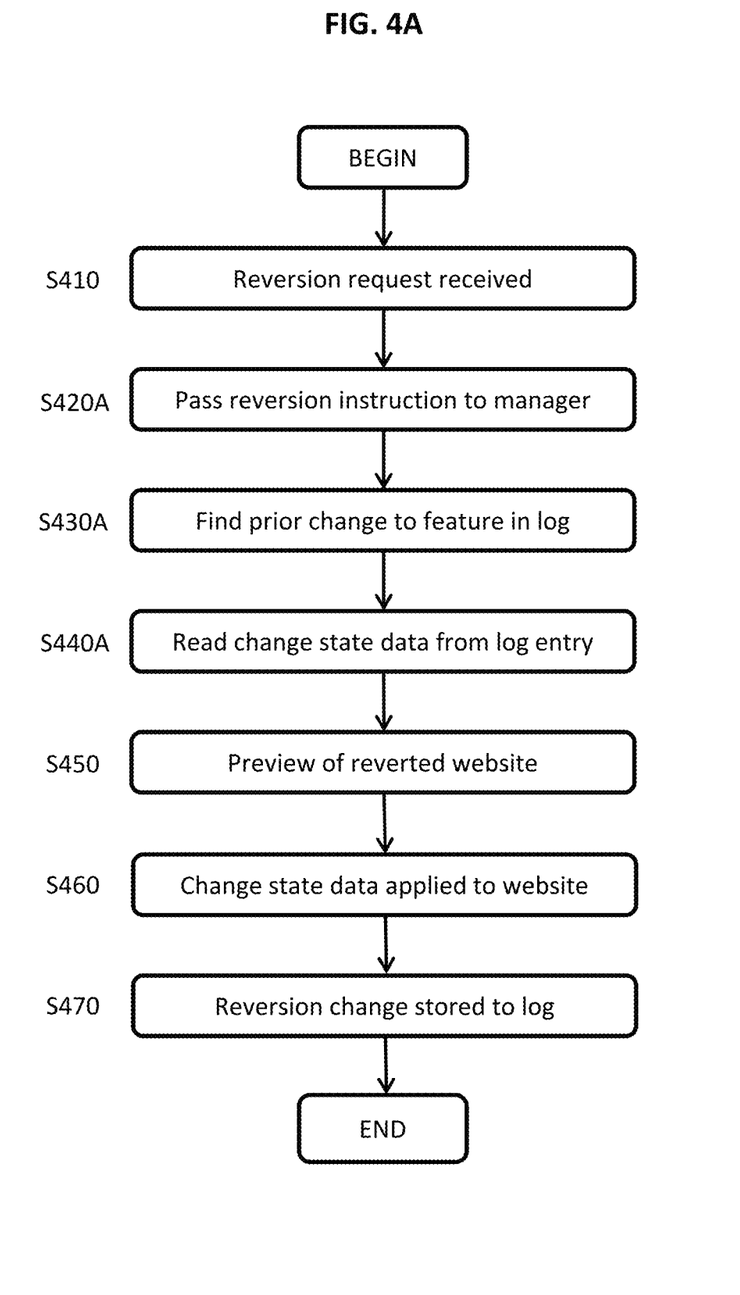
FIGS. 4A and 4B are flowcharts depicting two methods of reverting changes to a website, according to embodiments of the invention.
Figure 4B:
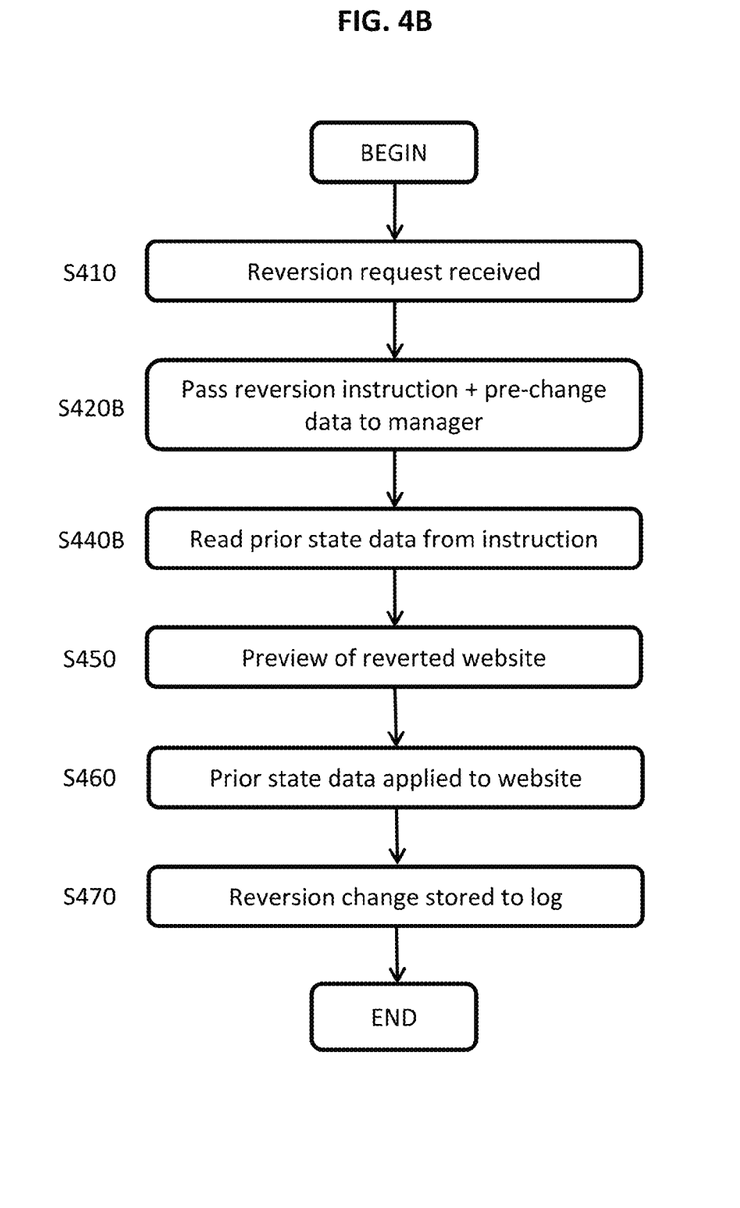

In some embodiments of the invention, a change described in a log entry may be confirmed as undesired through the software interface 101, and a reversion requested. If a change is confirmed as undesired and a reversion requested, the website 110 may then be reverted to a previous state. FIGS. 4A and 4B are flowcharts depicting two methods of accomplishing this, according to embodiments of the invention. In some embodiments, both methods may be available.

According to the embodiment of FIG. 4A, a reversion of a change is requested at S410. The central database software then transmits, to the change manager module 117, an instruction to revert the change, at S420A; this transmission includes the timestamp of the change and the changed feature. When the transmission is received, the change manager module 117 inspects the change log 119, at S430A, searching backwards from the timestamp until it finds a log entry containing a change to the same feature of the website. Once such a log entry is located, the change manager module 117 reads the change state data from the log entry at S440A, and the change is applied to the changed feature of the website at S460, thus reverting that feature of the website to its prior state.

According to the embodiment of FIG. 4B, a reversion of a change is requested at S410. The central database software then transmits, to the change manager module 117, an instruction to revert the change, at S420B; this transmission includes the pre-change data statement corresponding to the specific change, including the changed feature and the prior state data. When the transmission is received, the change manager module 117 reads the prior state data from the transmission at S440B, and the change is applied to the changed feature of the website at S460, thus reverting that feature of the website to its prior state.

Referring to both FIG. 4A and FIG. 4B, in some embodiments of both methods, the reversion will be presented in a preview form, at S450, through the software interface 101, and will not apply the reversion at S460 until the preview is approved. In some embodiments of both methods, the reversion is stored to the change log and to the central database in the same or a comparable manner as other changes, at S470.

4. Other Applications of the Invention

The methods and other processing instructions necessary to implement the system described herein may all be encoded on a non-transitory computer readable medium, with the instructions to be executed using one or more processors.

A processor or processors may be configured to execute the methods and other processing instructions described herein. The processor or processors may be in communication with a non-transitory computer readable memory storing the instructions; the memory may also store software or data implementing other features of the database, software and/or websites.

Additionally, separate processors may execute separate portions of the methods above, each processor in communication with separate non-transitory computer readable memory storing the corresponding instructions necessary for each such portion. In particular, one memory may contain a database along with processing instructions for executing the portions of the method directly related to the database, while another memory may contain the data for one or more websites along with processing instructions for executing the portions of the method directly related to the one or more websites; each memory associated with its own processor. Furthermore, each website may be contained on its own memory which does not contain any portion of any other website. The processors may communicate through transceivers which are mutually connected to each other through a network such as the Internet.

For convenience, the above description assumes that only changes made by an administrator—that is, a user granted the ability to change most or all elements of a website—will be logged and used in the manner described. As changes made by an administrator may be the most damaging, it may be ideal in many embodiments to focus the attention of the invention on such changes. However, those skilled in the art will recognize that the same principles may be used to log changes made to a website by any user, when the website permits changes by non-administrator users, without departing from the scope of the invention. For instance, for website that include forums where users may create posts, it may be desirable to log all such posts and filter for malicious scripts, profanity, or other undesired content. Similarly, for market websites where merchants may advertise sales, it may be desirable to log all ads and filter for sales that may be violations of marketplace rules or the law.

Although a few embodiments of the present invention have been shown and described, it would be appreciated by those skilled in the art that changes may be made in this embodiment without departing from the principles and spirit of the invention, the scope of which is defined in the claims and their equivalents. In particular, all or some of the above mentioned embodiments may be selectively combined with each other.

What is claimed is:

1. A method of processing changes to a plurality of websites, the method comprising:
   receiving a first instruction to change a first website;
   creating a first log entry reflecting the first instruction;
   storing the first log entry to a first change log associated with the first website;
   transmitting a copy of the first log entry to a memory containing a central database for storage in the central database;
   receiving a reversion instruction to revert the first instruction;
   extracting an information identifying a changed feature and a timestamp from the reversion instruction;
   searching the first change log for a prior log entry including a timestamp prior to the timestamp of the reversion instruction and further including an information identifying a changed feature which matches that of the reversion instruction; and
   changing, in the first website, the identified changed feature to reflect changed state data in the prior log entry,
   wherein the memory containing the first website does not contain the central database,
   wherein the first log entry includes:
      an entry identifier unique to the first log entry,
      an administrator identifier identifying the party that provided the first instruction,
      a website identifier identifying the first website,
      a timestamp reflecting a time of the receipt of the first instruction or the changing of the first website,
      information identifying a changed feature of the website changed in accordance with the first instruction, and
      changed state data reflecting a state of the changed feature following the change, and
   wherein a copy of a second log entry is also stored in the central database, the second log entry including a second website identifier identifying a second website separate from the first website.

2. The method of claim 1, further comprising:
   receiving a second instruction to change the second website;
   creating the second log entry reflecting the second instruction; and
   transmitting the copy of the second log entry to the memory containing the central database for storage in the central database,
   wherein the memory containing the second website does not contain the central database, and
   wherein the second log entry further includes:
      an entry identifier unique to the second log entry,
      an administrator identifier identifying the party that provided the second instruction,
      a timestamp reflecting a time of the receipt of the second instruction or the changing of the second website,
      information identifying a changed feature of the website changed in accordance with the second instruction, and
      changed state data reflecting a state of the changed feature following the change.

3. The method of claim 2,
   wherein a memory containing the first website does not contain any portion of the second website, and
   wherein a memory containing the second website does not contain any portion of the first website.

4. A non-transitory computer readable medium encoded with processing instructions for implementing the method of claim 1, using one or more processors.

5. A method of processing changes to websites, the method comprising:
   receiving a first instruction to change a first website;
   creating a first log entry reflecting the first instruction, wherein the first log entry includes:
      an entry identifier unique to the first log entry,
      an administrator identifier identifying the party that provided the first instruction,
      a website identifier identifying the first website, a timestamp reflecting a time of the receipt of the first instruction or the changing of the first website,
information identifying a changed feature of the website changed in accordance with the first instruction, and
changed state data reflecting a state of the changed feature following the change;
the method further comprising:
　storing the first log entry to a first change log associated with the first website;
　transmitting a copy of the first log entry to a memory containing a central database for storage in the central database;
　after transmitting the copy of the first log entry, receiving an reversion instruction to revert the first instruction;
　extracting an information identifying a changed feature and a timestamp from the reversion instruction;
　searching the first change log for a prior log entry including a timestamp prior to the timestamp of the reversion instruction and further including an information identifying a changed feature which matches that of the reversion instruction; and
　changing, in the first website, the identified changed feature to reflect changed state data in the prior log entry,
wherein the memory containing the first website does not contain the central database.

6. The method of claim 5, further comprising, before transmitting a copy of the first log entry, receiving a request for the log entry from a central processor associated with the memory containing the central database,
　wherein the log entry request is sent from the central processor each time a regular time period T elapses.

7. The method of claim 5, wherein the creation of the first log entry includes:
　locating, in a type mapping table, a table entry listing a feature matching the changed feature of the website, and further listing change details matching elements of the changed state data;
　reading from the table entry a change type identifier specifying a type of the first instruction; and
　storing the change type identifier to the first log entry.

8. The method of claim 7, wherein the change type identifier of the first log entry determines whether the first log entry will be stored in the central database.

9. The method of claim 7, wherein the change type identifier of the first log entry determines whether the first log entry will be transmitted to the central database.

10. A system of processing changes to websites, the system comprising:
　a first non-transitory computer readable memory;
　a first processor in communication with the first memory;
　a first transceiver in communication with the first processor and further in communication with a network;
　a central non-transitory computer readable memory;
　a central processor in communication with the central memory, and
　a central transceiver in communication with the first processor and further in communication with the network;
　wherein the first processor is configured to:
　　receive a change instruction to change a website contained on the first memory;
　　create a log entry reflecting the change instruction;
　　change the website in accordance with the change instruction, and
　　transmit a copy of the log entry through the first transceiver over the network to the central transceiver,
　wherein the central processor is configured to:
　　receive the copy of the log entry through the central transceiver, and
　　store the copy of the log entry to a central database contained on the central memory,
　　receive a reversion request for the change instruction, and
　　transmit, through the central transceiver, a reversion instruction including the information identifying a changed feature of the change instruction and the timestamp of the change instruction, and
　wherein the first processor is further configured to:
　　store the log entry reflecting the change instruction to a change log contained on the first memory,
　　receive, through the first transceiver, the reversion instruction,
　　search the change log for a prior log entry including a timestamp prior to the timestamp of the reversion instruction and further including an information identifying a changed feature which matches that of the reversion instruction, and
　　change, in the website, the identified changed feature to reflect changed state data in the prior log entry, and
　wherein the log entry includes:
　　an entry identifier unique to the log entry,
　　an administrator identifier identifying the party that provided the change instruction,
　　a website identifier identifying the changed website,
　　timestamp reflecting a time of either the receipt of the change instruction or the changing of the website,
　　information identifying a changed feature of the website changed in accordance with the change instruction, and
　　changed state data of the changed feature.

11. The system of claim 10,
　wherein the central processor is further configured to send a request for a log entry through the central transceiver to the first transceiver each time a regular time period T elapses, and
　wherein the first processor is configured not to transmit the copy of the log entry until the request for a log entry is received through the first transceiver.

12. The system of claim 10, wherein the first processor is further configured to:
　locate, in a type mapping table, a table entry listing a feature matching the changed feature of the website, and further listing change details matching elements of the changed state data;
　read from the table entry a change type identifier specifying a type of the change instruction; and
　store the change type identifier to the log entry.

13. The system of claim 12, wherein the first processor is further configured not to store the change type identifier to the log entry or to transmit a copy of the log entry unless the received change type identifier is designated as a red flag change type identifier.

14. The system of claim 10, wherein the central processor is further configured to:
　locate, in a type mapping table, a table entry listing a feature matching the changed feature of the website, and further listing change details matching elements of the changed state data;
　read from the table entry a change type identifier specifying a type of the change instruction; and
　store the change type identifier to the log entry.

15. The system of claim 14, wherein the central processor is further configured not to store the change type identifier to the copy of the log entry or to store the copy of the log entry to the database unless the received change type identifier is designated as a red flag change type identifier.

* * * * *